US010616174B1

(12) United States Patent
Liu

(10) Patent No.: US 10,616,174 B1
(45) Date of Patent: *Apr. 7, 2020

(54) CUSTOMIZED TELECOMMUNICATION MONITORING AND ALERTS USING A HIGH-LEVEL PROGRAMMING INTERFACE

(71) Applicant: 8x8, Inc., San Jose, CA (US)

(72) Inventor: Zhishen Liu, San Jose, CA (US)

(73) Assignee: 8x8, Inc., Campbell, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/013,515

(22) Filed: Jun. 20, 2018

Related U.S. Application Data

(60) Provisional application No. 62/523,982, filed on Jun. 23, 2017.

(51) Int. Cl.
*H04L 12/58* (2006.01)
*H04L 12/24* (2006.01)

(52) U.S. Cl.
CPC .............. *H04L 51/36* (2013.01); *H04L 41/06* (2013.01); *H04L 41/14* (2013.01)

(58) Field of Classification Search
CPC ................. H04L 65/1069; H04L 65/80; H04L 29/06027; H04L 65/1006; H04L 65/1009; H04L 65/1043; H04L 65/604; H04L 67/1002; H04L 67/1008; H04L 67/1012; H04L 12/1818; H04L 29/06; H04L 41/5054; H04L 41/5087; H04L 43/08;
(Continued)

(56) References Cited

U.S. PATENT DOCUMENTS 6,175,564 B1 * 1/2001 Miloslavsky ........ G06Q 10/107
348/E7.082
7,009,962 B1 * 3/2006 Chung .................... H04M 3/54
370/356
(Continued)

FOREIGN PATENT DOCUMENTS

WO        0135579        5/2001

OTHER PUBLICATIONS

"Cisco Hosted Unified Communications Services", Cisco Product Data Sheet, Jun. 18, 2007 (retreived May 31, 2016) http://www.cisco.com/c/en/us/products/collateral/unified-communications/product_data_sheet0900aecd80670040.html.

*Primary Examiner* — Greg C Bengzon
(74) *Attorney, Agent, or Firm* — Crawford Maunu PLLC

(57) ABSTRACT

Certain aspects of the disclosure are directed to customized communication monitoring and alerts using a high-level programming interface. According to a specific example, a data communication server is configured and arranged to provide a database with virtual office features available to remotely-situated client entities. The data communication server is configured to provide to the client entities, a set of instructions written in a first programming language that defines a message exchange protocol. The data communication server is further configured to receive from each client entity, client-specific sets of control data written in a second programming language that is compatible with the first programming language. The data communication server may monitor an operating state of each of the virtual office features provided to the client entity based on received event data, and generate alerts to end-users of the client entity according to the event data satisfying a set of criteria.

18 Claims, 6 Drawing Sheets

(58) Field of Classification Search
CPC ............ H04L 43/0829; H04L 43/0852; H04L 45/302; H04L 47/10; H04L 47/15; H04L 47/18; H04L 47/2408; H04L 47/2416; H04L 47/2441; H04L 65/1096; H04L 65/40; H04L 67/1095; H04L 67/14; H04L 67/141; H04L 67/2804; H04L 12/66; H04L 12/2803; H04L 12/2807; H04L 12/2812; H04L 12/2814; H04L 12/2818; H04L 2012/2849; H04L 29/12132; H04L 29/12169; H04L 41/0803; H04L 41/12; H04L 41/22; H04L 47/80; H04L 49/25; H04L 61/1552; H04L 61/1576; H04L 63/02; H04L 63/08; H04L 63/10; H04L 63/20; H04L 65/102; H04L 67/104; H04L 67/125; H04L 67/16; H04L 67/20; H04L 67/42; H04L 69/325; H04L 65/1046; H04L 65/1053; H04M 7/006; H04M 1/57; H04M 2201/36; H04M 2242/40; H04M 3/00; H04M 3/42323; H04M 3/42331; H04M 3/4283; H04M 3/53308; H04M 3/53333; H04M 2203/158; H04M 3/42059; H04M 3/5166; H04M 3/5233; H04M 3/5235; H04M 2242/12; H04M 3/4211; H04M 3/42391; H04M 3/465; H04M 19/041; H04M 1/2745; H04M 1/663; H04M 2203/2072; H04M 3/54; H04M 3/543; H04M 7/0033; H04M 7/0075; H04M 7/009; H04Q 2213/13204; H04Q 2213/1322; H04Q 2213/13286; H04Q 2213/13348; H04Q 2213/13389; H04Q 3/62; H04Q 3/0029; H04Q 3/0033; H04Q 3/0045; H04Q 3/005; H04Q 3/0054; H04Q 3/0058; H04Q 3/28; H04Q 3/38; H04Q 3/40; H04Q 3/625; H04N 21/00; H04N 21/40; H04N 7/181; H04N 7/147; H04W 12/00; H04W 12/06; H04W 12/08; H04W 4/80; H04W 4/12; H04W 4/16; H04W 8/18; H04W 8/26; H04W 92/02

See application file for complete search history.

(56) References Cited

U.S. PATENT DOCUMENTS

| | | | |
|---|---|---|---|
| 7,403,604 B2 | 7/2008 | Mundra et al. | |
| 7,606,914 B2 * | 10/2009 | Ikeda | H04L 47/20 |
| | | | 709/223 |
| 8,064,909 B2 | 11/2011 | Spinelli et al. | |
| 8,649,497 B1 * | 2/2014 | Shea | H04L 65/1069 |
| | | | 370/352 |
| 8,656,417 B2 | 2/2014 | May | |
| 8,843,999 B1 * | 9/2014 | Vasquez | H04L 65/1006 |
| | | | 726/28 |
| 8,918,867 B1 | 12/2014 | Salour | |
| 8,948,358 B1 | 2/2015 | Rengarajan et al. | |
| 8,964,726 B2 | 2/2015 | Lawson et al. | |
| 9,137,127 B2 | 9/2015 | Nowack et al. | |
| 9,160,696 B2 | 10/2015 | Wilsher et al. | |
| 9,213,533 B1 * | 12/2015 | Butaney | G06F 8/61 |
| 9,240,966 B2 | 1/2016 | Wilsher et al. | |
| 9,270,833 B2 | 2/2016 | Ballai et al. | |
| 9,294,433 B1 | 3/2016 | Salour | |
| 9,294,515 B2 | 3/2016 | Sayko | |
| 9,306,982 B2 | 4/2016 | Lawson et al. | |
| 9,306,985 B1 * | 4/2016 | Liu | H04L 65/40 |
| 9,338,064 B2 | 5/2016 | Stratton et al. | |
| 9,344,573 B2 | 5/2016 | Wolthuis et al. | |
| 9,407,597 B2 | 8/2016 | Lawson et al. | |
| 9,426,077 B1 * | 8/2016 | Knight | H04L 47/2416 |
| 9,426,116 B1 | 8/2016 | Salour | |
| 9,432,519 B1 * | 8/2016 | Liu | H04M 15/56 |
| 9,455,949 B2 | 9/2016 | Lawson et al. | |
| 9,456,008 B2 | 9/2016 | Lawson et al. | |
| 9,459,925 B2 | 10/2016 | Lawson et al. | |
| 9,459,926 B2 | 10/2016 | Shakirzyanov et al. | |
| 9,667,775 B1 * | 5/2017 | Haltom | H04M 3/543 |
| 9,699,226 B1 * | 7/2017 | Liu | H04L 65/1069 |
| 9,762,737 B1 * | 9/2017 | Liu | H04M 7/009 |
| 9,826,096 B1 * | 11/2017 | Slade | H04M 3/546 |
| 9,924,404 B1 * | 3/2018 | Salour | H04L 1/20 |
| 9,955,021 B1 * | 4/2018 | Liu | H04M 3/5232 |
| 10,057,412 B1 * | 8/2018 | Salour | H04L 67/42 |
| 10,122,682 B1 * | 11/2018 | Salour | H04M 7/006 |
| 10,135,974 B1 * | 11/2018 | Liu | H04M 3/42161 |
| 10,142,329 B1 * | 11/2018 | Liu | H04L 67/02 |
| 10,165,114 B1 * | 12/2018 | Liu | H04M 3/42323 |
| 10,298,751 B1 * | 5/2019 | Liu | H04L 65/1059 |
| 10,298,770 B1 * | 5/2019 | Liu | H04L 65/102 |
| 10,326,888 B1 * | 6/2019 | Miskovic | H04M 7/0075 |
| 10,348,902 B1 * | 7/2019 | Liu | H04M 3/5235 |
| 10,389,883 B1 * | 8/2019 | Liu | H04M 7/009 |
| 10,404,759 B1 * | 9/2019 | Liu | H04L 65/1059 |
| 2002/0019246 A1 * | 2/2002 | Forte | H04W 84/16 |
| | | | 455/555 |
| 2002/0075879 A1 * | 6/2002 | Ramey | H04M 7/006 |
| | | | 370/401 |
| 2003/0054864 A1 * | 3/2003 | Mergler | H04M 1/2745 |
| | | | 455/566 |
| 2003/0118004 A1 * | 6/2003 | Pan | H04L 29/06027 |
| | | | 370/352 |
| 2003/0118011 A1 * | 6/2003 | Wu | H04L 29/06027 |
| | | | 370/356 |
| 2003/0123432 A1 * | 7/2003 | Cheng | H04L 29/06027 |
| | | | 370/352 |
| 2003/0126183 A1 * | 7/2003 | Wu | H04L 29/06 |
| | | | 718/105 |
| 2003/0227907 A1 * | 12/2003 | Choi | H04L 29/06027 |
| | | | 370/352 |
| 2004/0001580 A1 * | 1/2004 | Mason | H04M 3/42323 |
| | | | 379/207.04 |
| 2004/0081194 A1 * | 4/2004 | Hayashi | H04Q 3/625 |
| | | | 370/462 |
| 2004/0170268 A1 * | 9/2004 | Hakusui | H04L 65/1006 |
| | | | 379/211.02 |
| 2005/0113078 A1 * | 5/2005 | Deitrich | H04W 4/16 |
| | | | 455/417 |
| 2006/0142010 A1 * | 6/2006 | Tom | H04Q 3/0045 |
| | | | 455/445 |
| 2006/0265376 A1 * | 11/2006 | Tagane | H04L 12/14 |
| 2007/0047534 A1 * | 3/2007 | Hakusui | H04L 29/06027 |
| | | | 370/356 |
| 2007/0047571 A1 | 3/2007 | Kandikonda et al. | |
| 2007/0091800 A1 | 4/2007 | Corcoran | |
| 2007/0115940 A1 * | 5/2007 | Kamen | H04L 63/0853 |
| | | | 370/352 |
| 2007/0115942 A1 | 5/2007 | Money et al. | |
| 2007/0206563 A1 * | 9/2007 | Silver | H04L 65/1016 |
| | | | 370/351 |
| 2007/0206571 A1 * | 9/2007 | Silver | H04L 65/1063 |
| | | | 370/352 |
| 2007/0206572 A1 * | 9/2007 | Silver | H04W 88/16 |
| | | | 370/352 |
| 2008/0082858 A1 * | 4/2008 | Hasegawa | H04L 41/0681 |
| | | | 714/3 |
| 2008/0123833 A1 * | 5/2008 | Hara | H04M 3/42323 |
| | | | 379/219 |
| 2008/0125077 A1 | 5/2008 | Velazquez et al. | |
| 2009/0067415 A1 * | 3/2009 | Liu | H04Q 11/0067 |
| | | | 370/354 |
| 2009/0086947 A1 * | 4/2009 | Vendrow | H04M 3/02 |
| | | | 379/201.12 |
| 2009/0201916 A1 | 8/2009 | Caron et al. | |
| 2010/0071053 A1 * | 3/2010 | Ansari | H04L 12/2807 |
| | | | 726/12 |
| 2010/0128709 A1 | 5/2010 | Liu et al. | |

(56) References Cited

U.S. PATENT DOCUMENTS

| | | | |
|---|---|---|---|
| 2010/0142516 A1 | 6/2010 | Lawson et al. | |
| 2010/0272098 A1* | 10/2010 | Ferguson | H04L 12/66 370/352 |
| 2010/0290455 A1* | 11/2010 | Erickson | H04L 12/66 370/352 |
| 2011/0026701 A1* | 2/2011 | Kirchhoff | H04M 3/436 379/207.13 |
| 2011/0081911 A1* | 4/2011 | Silver | H04L 12/66 455/445 |
| 2011/0130168 A1* | 6/2011 | Vendrow | H04M 1/57 455/556.1 |
| 2011/0170681 A1 | 7/2011 | Kole et al. | |
| 2011/0177797 A1* | 7/2011 | Vendrow | H04M 3/4234 455/414.1 |
| 2011/0320550 A1 | 12/2011 | Lawson et al. | |
| 2012/0083250 A1* | 4/2012 | George | H04M 3/42314 455/414.1 |
| 2012/0208495 A1 | 8/2012 | Lawson et al. | |
| 2012/0254293 A1* | 10/2012 | Winter | H04Q 3/62 709/203 |
| 2012/0304245 A1 | 11/2012 | Lawson et al. | |
| 2013/0036189 A1* | 2/2013 | Stevens, III | H04L 65/1006 709/217 |
| 2013/0036227 A1* | 2/2013 | Stevens, III | H04L 67/1008 709/226 |
| 2013/0072153 A1 | 3/2013 | Lawson et al. | |
| 2013/0128883 A1* | 5/2013 | Lawson | H04M 1/2473 370/352 |
| 2013/0212603 A1 | 8/2013 | Cooke et al. | |
| 2013/0223605 A1* | 8/2013 | Statham | H04M 3/10 379/201.02 |
| 2013/0225235 A1* | 8/2013 | Elter | H04W 4/16 455/555 |
| 2013/0304929 A1 | 11/2013 | Fahlgren et al. | |
| 2014/0044123 A1 | 2/2014 | Lawson et al. | |
| 2014/0050083 A1* | 2/2014 | Layman | H04L 12/56 370/230 |
| 2014/0105372 A1 | 4/2014 | Nowack et al. | |
| 2014/0140196 A1* | 5/2014 | Layman | H04L 41/0659 370/216 |
| 2014/0140200 A1* | 5/2014 | Layman | H04L 65/1053 370/218 |
| 2014/0140202 A1* | 5/2014 | Layman | H04L 41/5009 370/221 |
| 2014/0270109 A1 | 9/2014 | Riahi et al. | |
| 2014/0280157 A1* | 9/2014 | Chen | G06Q 30/0271 707/737 |
| 2014/0301249 A1* | 10/2014 | Moss | H04L 65/1069 370/260 |
| 2015/0003297 A1* | 1/2015 | Hancock | H04L 65/1069 370/259 |
| 2015/0016596 A1* | 1/2015 | Bellstedt | H04M 3/42331 379/201.03 |
| 2015/0156616 A1* | 6/2015 | McComb | G06F 16/2455 455/417 |
| 2016/0277587 A1* | 9/2016 | Alexander | H04M 3/2218 |
| 2016/0366370 A1* | 12/2016 | Hamling | H04N 7/147 |
| 2017/0054784 A1* | 2/2017 | Panattu | H04L 65/80 |
| 2017/0085596 A1* | 3/2017 | Hopson, III | H04L 65/1006 |
| 2017/0374195 A1* | 12/2017 | Siminoff | H04M 3/42195 |

\* cited by examiner

CUSTOMIZED TELECOMMUNICATION MONITORING AND ALERTS USING A HIGH-LEVEL PROGRAMMING INTERFACE

OVERVIEW

Aspects of various embodiments are directed to communication and computing services. Data communication platforms have allowed individuals to transmit and receive communications using broadband Internet connections in place of traditional telephone lines. A data communication endpoint device can use a broadband Internet connection to connect to a data communication server that is managed by a data communication service provider. The data communication server can handle communication routing and provide other data communication services for the data communication endpoint device.

Computing servers are increasingly being used to provide various data communications services over a network including, but not limited to, routing of Voice over Internet Protocol (Data communications) communications and/or data service providers for providing communications services such as messaging, video conferencing, management of data communications exchange servers, packet switching, traffic management, website hosting, remote data storage, remote computing services, and management of virtual computing environments, among other examples. For ease of reference, the various applications, systems and services that may be provided by such computing servers may be collectively referred to as data communications services.

The use of data communication services has been widespread and significant in terms of both numbers of users and types of services being made available. This growth may be attributable to any of a wide variety of socio-economic changes such as the mobility of users of these services, the types and reduced costs of portable communication tools, and the ever-evolving technology adapting to the personal and business needs of the communications users.

For business entities, the increased use of data communications services has been particularly complex, largely due to providing the same level of personal features to users from the vantage point of each business entity's communications platform. As examples, a data communications service provider can be providing such data communication services to a multitude of business entities each of which uses the provided services for a customized platform configured to provide communications services to a wide range of employees. For each such customized platform, it can be particularly burdensome for the data communications service provider to adjust and reconfigure the customized platform (of each respective business entity to which such services are being provided) each time a business entity (e.g., as requested by the entity's IT department, employee(s) or others) changes in terms of the employee's communications equipment/endpoint devices.

SUMMARY

Various example embodiments are directed to issues such as those addressed above and/or others which may become apparent from the following disclosure concerning systems and methods for customized communication monitoring and alerts using a high-level programming interface.

Embodiments are directed toward methods for use in communications systems employing a data communication server operated by a communications provider, where the data communication server is on the data communication provider side used to provide data communication services to a multitude of client entities. In such contexts, the data communication server may be referred to as a data communication provider server. In such systems, the data communication server includes one or more computer processor circuits (configured with access to databases stored in memory circuits) and configured to act as a communications-control engine for routing, processing communications and/or providing related communications services on behalf of client entities. Such client entities may be exemplified respectively as the above-noted businesses with employees ranging in number from just a few to thousands, and being located/mobile for communications services in any of a multitude of venues. In these embodiments, such methods use the communication-control engine to provide such communications services by receiving data communication from data communication endpoint devices, and identifying client-specific sets of control data (e.g., providing directives or commands with communication processing data), derived from programming instructions written in a first instruction-configurable/programmable language that is associated with a message exchange protocol that is used between the data communication routing server and data sources. Examples of such client-specific sets of control data may include other forms of code providing data and/or instructions over an interface facilitating communication between the communications provider and the data communication endpoint devices. Such methods execute the client-specific sets of control data to make decisions on how to route communications placed by the data communication endpoint devices, and to identify a set of instructions (written in a second instruction-configurable/programmable language) associated with the routing decisions.

The first and second programmable languages may be similar, in that both languages are derivatives of a same type of programmable language, but the first and second programmable languages may differ in terms of content and use. The first programmable language may identify communication processing directives provided to the communications provider by the client entity, whereas the second programmable language may identify communication routing directives as provided by the communications provider. Such methods execute the set of instructions to retrieve data from the data sources maintained by the communications provider, and provide, in response to the data, communication control functionality for the data communication placed by the endpoint device. The first and second programming languages are related languages, whether indirectly or directly related via at least one level of translation. For example, or analogous to, C++, compiled to assembly/object level code and a converted to higher-level, different language or set of instructions.

Certain embodiments are directed toward an apparatus for communications over one or more wide-band networks. The apparatus may comprise one or more computer processor circuits coupled to memory circuits and configured to interface with a plurality of remotely-situated client entities. The apparatus is configured and arranged to provide a database with a set of virtual office features including client-specific communication routing functions, available to remotely-situated client entities based on a subscription. Moreover, the apparatus is configured and arranged to interface with the client entities using the first programming language. The apparatus is further configured and arranged to provide to the client entities, a set of instructions written in a first programming language that is associated with a message exchange protocol between a data communication provider server and data sources. The set of instructions include aspects of the message exchange protocol to be populated with client-specific directives associated with virtual office features available to the client entities. The client-specific sets of control data may be generated by the client entity by populating the set of instructions (received from the data communication provider server) with the client-specific directives. In turn, the apparatus may generate event data corresponding to the virtual office features provided to the client entities. In certain embodiments, the apparatus includes a communication control engine including at least part of the data communication server. The communication control engine can be configured and arranged to adjust the virtual office features provided to sets of control data. The client-specific sets of control data can be derived from programming instructions received from the client entity over the message exchange protocol. As described herein, the programming instructions correspond to a second programming language that is compatible with the first programming language. The communication control engine may monitor an operating state of each of the virtual office features provided to the end-users based on the event data. Moreover, the communication control engine can generate an alert to an end-user associated with the client entity, according to the monitored operating state satisfying a set of criteria specified in the client-specific sets of control data.

Certain embodiments are directed toward an apparatus including a computing server and a processing circuit communicatively coupled to the computing circuit. The computing server can be configured and arranged to provide data communications for a plurality of extensions, each respectively associated with an account of a respective client entity. The computing server can interface with the data communication server which provides the virtual office features to the extensions based on a subscription. Moreover, the processing circuit of the apparatus can generate a set of programming instructions for the client entity based on directives received as input on behalf of the client entity. The programming instructions can include alert criteria for the particular client entity. In such a manner, the processing circuit can facilitate a comparison of operating state information associated with the virtual office features to the alert criteria by communicating the operating state information to the data communication server in real-time.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
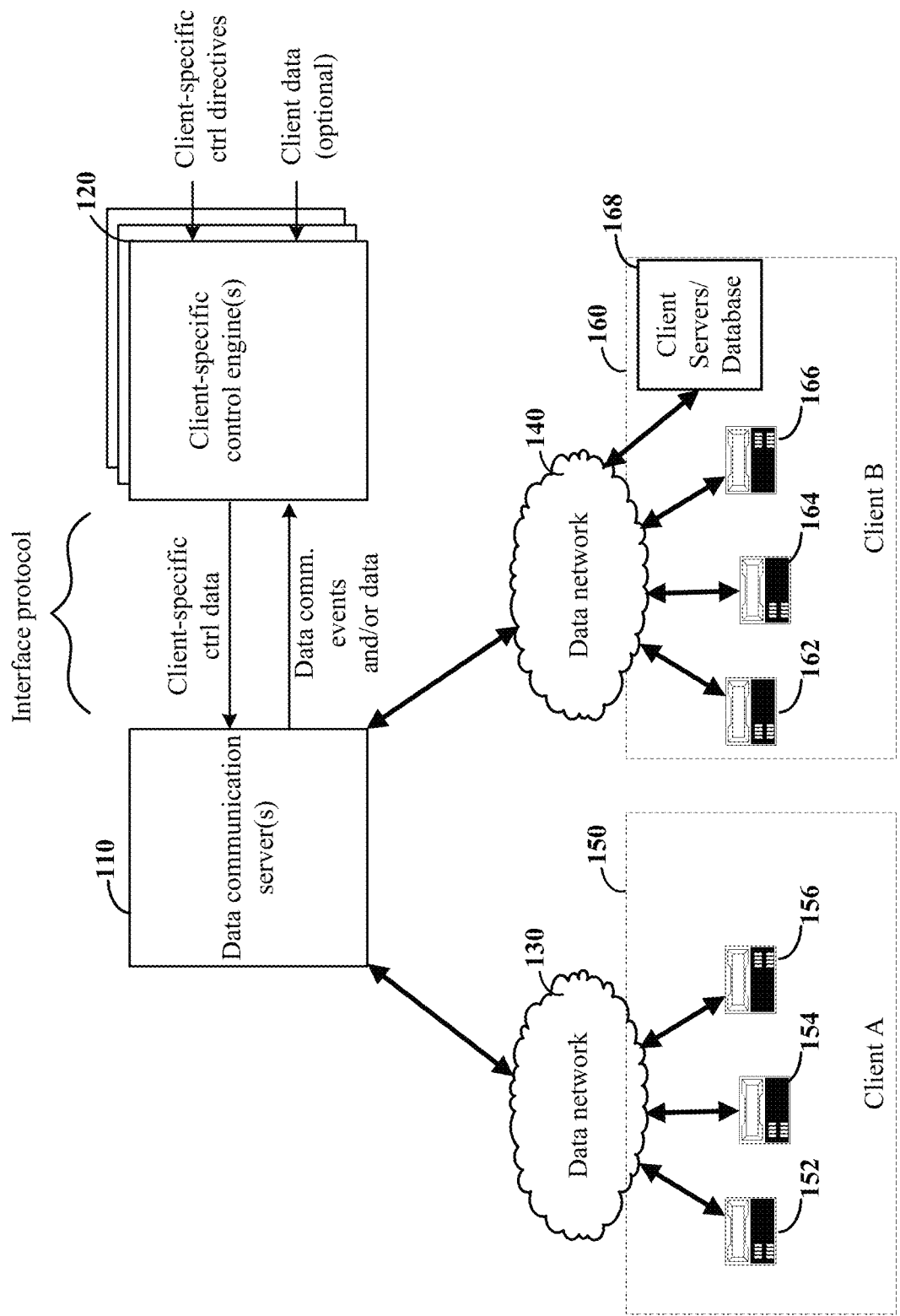
FIG. 1 is a diagram for customized communication monitoring and alerts using a high-level programming interface, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving customized communications monitoring and alerts using a high-level programming interface. In certain implementations, aspects of the present disclosure have been shown to be beneficial when used in the context of providing data communications services. While the present disclosure is not necessarily limited to such data communications systems as described herein, for purposes of facilitating understanding and appreciation of certain embodiments, the following discussion uses such data communication-based services and systems in the context and on behalf of communications platforms of client entities which subscribe to such services from a data communication service provider (with a server).

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination. For ease of explanation, some examples may be primarily described with reference to data communication servers configured to provide data communication services for endpoints of a plurality of different client accounts. It is understood that the various examples may be adapted for use with computer servers configured to provide various other remote services, including, but not limited to: website hosting, remote data storage, remote computing services, virtual computing environments, enterprise communications, virtual contact center, and other services.

Some remote service providers customize their services for different customers. This might include customizable auto attendants, communication routing, communication forwarding, voicemail, monitoring, alerts, or other features. For particularly large clients with many different telephone accounts and numbers, implementing and updating these types of customizations can be a significant undertaking. Certain embodiments of the present disclosure are directed toward an interface that allows a client-specific control engine to access and dynamically adjust the manner in which remote services are provided and/or monitored for the users of a client account during operation, while maintaining the integrity and security of the underlying system for providing the remote services.

According to certain embodiments, a data communication system may be configured to allow a client-specific control engine to dynamically modify and control the communication flow and processing at different levels within the system, including (re)routing of incoming communications generally and by way of private branch exchanges (PBXs) and Internet Protocol PBXs (or IP PBXs) to provide intelligent routing relative to receptionists and direct dial numbers for individuals using the IP PBXs. Within these constraints, a customer can write code that self-describes the building blocks or particular configurations used in the customer's particular application, which can be interpreted and executed by the data communication provider. In various embodiments, the building blocks or particular configurations and the data communication servers that execute the building blocks or particular configurations can be configured to interface with other sources of data and control. This can include, for example, flow control decisions that are based upon code running on the client side or on the provider side. As non-limiting examples, a client-side computer system could run code that is written using JavaScript or TCL while a server-side computer system might run code that is written using PHP: Hypertext Preprocessor (PHP), NodeJS, Python, Scala, Ruby, .Net, or other web languages.

Rules of various complexity can be used for routing incoming communications, whether to one or more receptionists, directly to extensions, to voicemail, or for other communication routing purposes. The logic used for the routing decisions can be based upon directives and related data shared across multiple PBXs, data that can be dynamically changed, and upon rules and logic that can be defined according to multiple tiers of communication routing decisions. For example, a large company may have many different offices or store locations. Portions of the communication routing and processing can be shared across the entire company. Other portions could be shared with subsets or groups (e.g., groups based upon geographic regions or countries or based upon different company divisions). Still further portions can be set based upon individuals being called. Such aspects can facilitate the configuration, management, and updating the data communication system, particularly in situations where there are many thousands of extension rules can be a difficult proposition.

According to certain embodiments, the data communication system provides inbound and outbound communication routing for one or more PBXs. A PBX is a telephone system that switches calls between enterprise users on local lines while allowing all users to share a certain number of external phone lines. External phone lines are telephone lines that are supported by telephone carriers as being individually addressable within the public switched telephone network (PSTN). For example, a PBX can use extensions to direct calls to many phones after a caller first makes a call to a shared number. As another example, a PBX can provide direct Inward Dialing (DID). DID is a service where a telephone carrier provides a block of telephone numbers that are each routed to a PBX system rather than to individual telephone lines. Using DID, individual phone numbers can be provided to each person or workstation without separate physical lines into the PBX for each possible connection.

According to certain example embodiments, a data communication system is configured as a Platform as a Service (PaaS) that provides a user with access to, among other things, telephone communication routing control, PBX functions, computer telephony integration (CTI), and data analytics (in this context the user can refer to, e.g., person, group, server or CPU, or subscribing business entity). Embodiments of the present disclosure are directed toward an interface that allows users of the data communication system solution to access data communication capabilities of the underlying system, including its hardware and software components, while maintaining the integrity and security of the underlying system. Particular embodiments are directed toward a communications solution that allows for customization of various virtual office features for end-users of the data communication system. The virtual office features may be adjusted for such end users, while also providing the ability to interface with data sources that are either part of the underlying system or external to the communications solution. These features can be used in combination with a communication routing system that can be configured and adjusted in a scalable manner. As end-users can customize the various virtual office features provided, so too can the performance of the virtual office features be monitored in a customized manner. Customers can specify parameters to monitor with regard to the virtual office features, and can specify when and how an alert may be generated based on the monitoring.

The ability to access the underlying data communication services, including communication routing and communication control engines, can provide a platform that is both flexible and simple to implement from the viewpoints of both the data communication provider and the customers of the data communication provider. The communications solution can be configured to modify the virtual office features available to different end-users, and to control the communication flow and processing at all levels within the system, including (re)routing of incoming communications to different PBXs. When compared to an add-on type service where a communication is first handled by a separate PBX, the communications solution may offer a number of advantages and additional features including, but not limited to, increased communication routing capabilities, scalability, and reduced complexity. For instance, access to PBX functions allows for simple communication redirection to extensions or DID numbers provided by the PBX. Moreover, the communications solution coordinates and routes communications between multiple PBXs using an initial communication routing switch. Communications initially routed to a particular PBX can still be rerouted to a different PBX using the initial communication routing switch. Yet further, the communications solution allows a data communication client having multiple end-users to customize the various virtual office features provided to the end-users, without compromising the security of the underlying system or requiring additional customization by the data communication provider.

The data communication servers providing the underlying function for the data communication system can be configured to utilize a programmable (or configurable) communication protocol such as a high-level, domain-specific programming language as might be implemented with respective data communication servers providing data communication routing and IP PBX functions on respective sides of an interface configured to facilitate the communications via the defined protocol. A particular example of a data communication server may use session initiation protocol (SIP) to handle various communication functions (e.g., communication setup and tear down). However, the various embodiments discussed herein are not necessarily limited thereto. Consistent with the above and in other embodiments disclosed herein, the data communication servers can be configured to establish a portion of the communication from the data communication endpoint devices to another data communication endpoint device or to endpoints on the PSTN through use of a PSTN gateway. Each of the endpoint devices includes data communications-enabled circuitry, and may include for example, IP phones, smart phones, tablets, desktop computers, plain old telephone service (POTS) telephones, and cellular-capable devices among other example devices with circuitry configured and arranged to facilitate sending and receipt of data communications.

According to more specific example embodiments, a high-level domain-specific programmable communication protocol (e.g., specific to customer-entity domains) uses one or more languages which are defined using a markup language as the basis for the language structure. Particular implementations relate to the use of at least two domain-specific languages, one that can be used for initial communication routing and the other for providing more complex and specific communication processing functions. More particular example embodiments use an eXtensible Markup Language (XML). An XML model defines the constraints on the high-level language, including defining the set of valid commands that can be carried out by the data communication servers. Within these constraints, a customer can write XML code that self-describes the building blocks or particular configurations used in the customer's particular application. For instance, a common set of instructions, written in the high-level language (e.g., an XML language) may be provided by a data communication provider to client entities. The common set of instructions may form a template to be populated with client-specific directives, the populated template forming programming instructions that instruct the data communication provider how a particular client entity is to be configured for various data communication services. The data communication provider may derive client-specific sets of control data from the programming instructions, and store the client-specific sets of control data for subsequent retrieval and implementation. In such a manner, the data communication provider may provide a lightweight and simplified set of instructions to client entities, and client entities may provide the data communication provider with instructions to customize the virtual office services for that particular client entity. XML also allows for various different data structures to be embedded into the XML document or file. For example, a script written in JavaScript can be embedded as character data that the data communication servers are configured to identify and execute. Unless otherwise stated, the use of XML in connection with various embodiments does not necessarily limit the corresponding embodiments, such as limiting the embodiments to the use of only an XML-based language(s). As used herein, such domain-specific programming language(s) are referred to as high-level markup languages (e.g., XML derivative languages or XML-type languages).

Various examples of such XML derivative languages are exemplified in the Appendix as attached to the underlying U.S. Provisional Patent document (Application No. 62/523,982 filed Jun. 23, 2017) incorporated herein by reference. In certain example data communication applications, two XML-type languages are implemented as a communication processing XML and a communication routing XML, respectively as XML derivative languages corresponding to XML but customized for processing data communication on the side of the interface operating on behalf of customer entities and on the other side of the interface for higher level processing (including, for example, communication routing) by the data communication service provider. Such XML derivative languages can be written specific to types of functionality as needed for various customer entities, thereby allowing developers to program communication processing logic or service execution logic with both XML building blocks and JavaScript/TCL, or other scripting languages best suited to levels (e.g., in terms of quantity range) of a customer's endpoint devices and/or in terms of complexity of the data communication-based media functionality and evolving demands expected by a customer. In certain implementations, XML derivative languages allow data communication customer developers to program and integrate data communication flow (e.g., as provided by a cloud-based data communication service) with customer or third party application servers and databases. In particular, the communication flow can include a connection that is used as part of communication routing decisions and communication processing options that are related to one or more receptionists that can answer communications to a group of endpoint devices. The system allows different levels of communication control logic to be implemented in a manner that can facilitate scalability of the system of large organizations with many endpoint devices and/or end-users and with complex organizational structures that have corresponding complex communication routing requirements.

For ease of discussion, various embodiments are discussed in terms of XML, and more particularly, XML derivative languages. The skilled artisan would appreciate that each such XML-type embodiment is not necessarily limited to XML, XML derivative languages, or variants of XML. The corresponding directives, control and related communications data can be provided in documents corresponding to other languages and/or communications protocols; for example, one such programming language can be used for initial communication routing and another programming language can be used for providing more complex and specific communication processing functions.

According to particular embodiments, an XML engine can respond to a communication, or other event, by sending requests to a web server and get XML derivative documents (e.g. a set of instructions) for processing (providing a set of directives or instructions for taking action), thereby operating in a stateless manner that is similar to how an Internet browser, or similar interface uses Hypertext Markup Language (HTML). The XML engine can interpret a received XML derivative document to identify XML building blocks that are then rendered (i.e., executed). Each building block can define logic relating to one or more functions, such as for voice, communication control, flow control logic, monitoring and/or alerts. The XML engine may also execute other types of code, such as JavaScript, to create dynamic content (e.g., dynamically generated XML-derivative) for client-side flow control. Each XML derivative document may have uniform resource identifier (URI) links to a web server for iterative processing, or it may include query requests for retrieving data from various sources of data. A query could be formatted for consistency with the source of the data (e.g., by using JavaScript Object Notation (JSON) to retrieve data from third party application servers or from the data communication server provider's cloud database). This information can then be used to drive communication flow or communication control functionality and decisions.

As applicable to routing decisions relating to receptionists, an incoming communication can be processed according to an XML document with instructions (e.g., client-specific sets of control data) for determining whether communications route to a receptionist, directly to a called endpoint device, or are routed and processed in some other manner. As an example, the XML document could include a set of global rules for determining how to handle communications to endpoints of a customer (e.g., a large business with many individuals and corresponding endpoint devices). XML documents can also specify local rules for routing communications (e.g., to endpoint devices, voicemail, auto communication attendants), or otherwise processing the communication. The local rules might be used if global rules specify that the communication is not routed to a receptionist, or if the receptionist rejects or forwards the communication on. Each of the local and global rules can be driven, at least in part, by data retrieved from a data source, such as a client server or database. As an example, the global rules could access a customer database that includes lists of caller IDs that are handled differently. The communication routing data communication server does not need to have direct access to the lists of caller IDs (which might be confidential lists and thereby represent a security risk if shared directly with the data communication server). Rather, the data communication server can send a query that includes a specific caller ID number of an incoming call. In response to the query, information can be provided that indicates how to process the communication (e.g., whether to route the incoming communication to a receptionist or directly to the dialed endpoint device).

According to various embodiments, the high-level programming language allows a programmer access to the communications solution by way of a controlled and limited set of communication control functionality in the form of communication processing and routing operations. The limitations on the operations can be particularly useful for allowing programming control to be placed into the hands of different customers of the provider of the data communication servers. For example, the provider can update or make other changes to how the data communication servers are configured without requiring modification to documents written to use the high-level language, which might otherwise be required to account for the changes. Moreover, the data communication servers and their data can be protected from poor programming decisions (intentional or otherwise) by tightly controlling the extent that the documents provide control of, or access to, the inner workings of the data communication servers. In a similar manner, in various embodiments, the data communication customer can update or make changes to the various virtual office features that are provided to end-users to provide a customizable solution for each data communication customer and their respective end-users.

In various embodiments, the high-level programming language and the data communication servers that execute the high-level programming language can be configured to interface with other sources of data and control. This can include, for example, flow control decisions that are based upon code running on the client side or on the server side. As non-limiting examples, a client-side computer system could run code that is written using JavaScript or TCL while a server-side computer system might run code that is written using PHP: Hypertext Preprocessor (PHP), NodeJS, Python, Scala, Ruby, .Net, or other web languages.

In example embodiments, a data communication provider server may be configured to provide customized virtual office features (e.g., data communication services) to clients of the data communication provider. The data communication provider server may include one or more computer processor circuits coupled to memory circuits and configured to interface with a plurality of remotely-situated client entities. The data communication provider server can be configured and arranged to provide a database with a set of virtual office features including client-specific communication routing functions. The set of virtual office features, including communication routing functions, may be available to remotely-situated client entities based on a subscription provided by the data communication provider. The data communication server can provide to the client entities, a set of instructions written in a first programming language that is associated with a message exchange protocol between the data communication provider server and data sources.

The set of instructions can include aspects and/or portions that are to be populated (e.g., supplemented) with client-specific directives associated with virtual office features available to client entities. For example, the data communication provider server can provide to each client entity, a common set of instructions defining various aspects of virtual office features provided to the client entities. This set of instructions may serve as a sort of template, or default configuration, of virtual office features provided to the client entities. In turn, the client entities may provide to the data communication provider server, programming instructions from which client-specific sets of control data are derived, which allow the data communication provider server to customize the virtual office features provided to each particular client entity. The programming instructions can be written in a second programming language that is compatible with the first programming language (e.g., the language in which the set of instructions from the data communication provider are written in). Moreover, the programming instructions can be generated by the client entity (by a client-specific control engine) by populating or combining the set of instructions received from the data communication provider server with a set of directives associated with the virtual office features available to the client entity. The client-specific sets of control data, derived from the programming instructions and stored for subsequent retrieval and implementation by the data communication provider, can be used to provide an adjusted set of features to end-users of the client entities (e.g., based on and according to the client-specific sets of control data)

The adjusted set of virtual office features may be a subset of the virtual office features to which the client entity has subscribed. For example, a client entity such as a fitness company may subscribe to a particular set of communications services hosted by the data communication server. The client entity may have a number of franchises located in different geographic regions, and each franchise location may have different needs for communications services. As such, the client entity may wish to provide different types and/or different configurations of data communication services for its different franchise locations. In such a manner, the data communication server may provide an adjusted set of features to end-users of the client entities according to client-specific sets of control data. In another non-limiting example, the client entity may utilize a number of PBXs or IPBXs, and may segment the various end-users among the different PBXs, such that incoming communications are routed to one of the many PBXs associated with the client entity.

The client-specific sets of control data, associated with each respective client entity, may define aspects of the set of adjusted virtual office features provided to that particular client entity. As described herein, the programming instructions received by the data communication provider server from the client server may be written in a programming language that is associated with a message exchange protocol between the data communication provider server and data sources. For instance, the programming instructions, written in the programming language, may specify aspects of the virtual office features to be monitored, and/or performance measurements of the virtual office features which would trigger generation of an alert. Examples of aspects of the virtual office features to be monitored may include monitoring of a server providing the data communication services, and/or monitoring of the virtual office features themselves, among other examples.

The programming instructions provided by the client entity may define various aspects of the virtual office features provided to end-users of the client entity. For instance, the programming instructions may define handling procedures of phone communications and/or conference communications for end-users of the client entity. The programming instructions may define a manner in which phone communications to and/or from the end-users are routed upon receipt. Similarly, the programming instructions may define a communication queue process for communications placed to the end-users, and/or designate an automated communication attendant to route data communications placed to the end-users. For example, a data communication client may instruct a data communication provider to configure the client to queue incoming communications, to assign incoming communications to one or a plurality of communication queues purchased according to a subscription, and to limit a number of communications to be placed in each of the communication queues. The data communication client may also instruct the data communication provider server to configure the client entity to create subgroups of end-users, such that incoming communications may be routed to a particular subgroup of end-users. Performance parameters may be established and/or defined for each of these configurations, and the performance of the same may be monitored. Similarly, the client entity can define when and/or how an alert is provided if such performance criteria are not satisfied.

The programming instructions may also define system integration processes. Each client entity may utilize a number of network applications to support daily operations. For instance, the client entity may utilize an email application, an appointment scheduling application, and/or a messaging application, among other examples. The adjusted virtual office features provided to the end-users by the data communication server may be configured to define a manner in which the adjusted virtual office features operate in collaboration with the different network applications of the client entity. For example, the virtual office features provided by the data communication server may collaborate with the client's email application, allowing end users to communication contacts from their email application using the virtual office features. Similarly, the virtual office features may be customized for the client entity such that the adjusted virtual office features provide notifications and/or alerts to end-users when messages, correspondence or other forms of communications are received via network applications of the client entity. Such notifications and/or alerts may be indicative of operations of the network applications of the client entity. For instance, the adjusted virtual office features provided by the data communication server may allow an end-user to receive a notification when a communication is received from a contact on a social media site, and/or to retrieve information for a particular customer from a customer relationship management (CRM) application when a communication is received from the particular customer.

The client-specific sets of control data, as derived from the programming instructions provided by a client server on behalf of a client entity, may define aspects of analytics solutions available to the client entity and/or end-users of the client entity. For example, a particular client entity may desire to obtain (from the data communication server) detailed monitoring reports on communication activity of its respective end-users, including numbers of active communications, abandoned communications, talk time, ring time, and detailed communication records, among other examples. The client entity may further wish to obtain (from the data communication server) real-time monitoring information on communication clarity and quality issues for each of its respective end-users. As such, the client-specific sets of control data may define for the data communication server, various data points to be collected that indicate performance of the set of adjusted virtual office features provided to the end-users. Such monitoring solutions allow the client entity to evaluate system performance metrics measured by the data communication provider, on behalf of the client entity.

In various embodiments, a data communication client server may be provided, comprising one or more computer processor circuits coupled to memory circuits and configured to interface with the data communication provider server. As described herein, the data communication provider server can be configured to provide a database of virtual office features available based on a subscription. Similarly, the data communication client server can receive from the data communication provider server, a set of instructions written in a first programming language that defines a message exchange protocol between the data communication provider server and data sources. The data communication client server can further generate client-specific sets of control data written in a second programming language that is a subset of the first programming language. The second programming language may be considered a subset of the first programming language, and is associated with virtual office features available to the client entity. For instance, the client-specific sets of control data, provided in the second programming language, may further define and/or adjust the virtual office features provided to a client entity and/or end-users of the client entity.

The data communication client server can transmit to the data communication provider server, programming instructions written in the programming language such that the adjusted virtual office features may be configured. The data communication client server can access the set of adjusted virtual office features provided by the data communication provider server. In some instances, the client entity can allow the data communication provider to indirectly access data sources of the client entity. For example, the client entity can specify a URI that points to the data communication client server and specifies an associated query. The data communication client server can execute, for example, a local script that may rely upon customer data. The script can generate a response in the particular programming language, and the data communication provider server can then carry out communication routing, or other communication control functions, based upon the response and without ever having direct access to the customer data. As such, the data communication client server can be configured to provide programming instructions from which client-specific control data are derived, where the client-specific control data instructs the data communication provider server to retrieve data from the data sources based on the accessed set of adjusted virtual office features. The data communication client server may provide, in response to the retrieved data, communication control functionality to end-users of the client entity based on the accessed set of adjusted virtual office features.

Consistent with various embodiments of the present disclosure, programming instructions provided by the data communication client server to the data communication provider server may define various aspects of the virtual office features provided to client entities and/or end-users of client entities. For instance, a client entity may wish to provide different virtual office features to different subgroups of end-users, and/or to configure different virtual office features differently for different subgroups of end-users. For instance, the client entity may wish to monitor different aspects of virtual office features for different groups and/or subgroups of end-users, and/or to configure different alert criteria for different groups and/or subgroups of end-users. Such subgroups may differentiate business units of end-users that have different needs for virtual office features compared to other business units. As such, client-specific sets of control data may define a plurality of end-user subgroups of the client entity, and the data communication client server may be configured to provide access to the set of adjusted virtual office features according to permissions of the end-user subgroups. Similarly, the programming instructions may define a plurality of data subscriptions to be included in the set of adjusted virtual office features, and the data communication client server may be configured to access the plurality of data subscriptions using the data communication provider server.

Programming instructions may be generated by a client server responsive and according to client-specific directives. Consistent with the above-characterized embodiments, at the client side of the data communications services, the client's computer-based processing resource (e.g., by the client-specific control engine) generates and submits programming instructions for assessment and use by the data communications service provider. Client-specific control data may be derived from the programming instructions and stored for subsequent retrieval and implementation by the data communication service provider. In a typical implementation, these programming instructions can be realized using codes or one or more commands (or a script of program-created commands). As examples, such codes or command sets can be implemented using a variety of programming control approaches. These approaches include, for example, a programming language (such as C++, XML, JAVA, HTML, SQL, etc.) common to both the client-specific control engine and to the data communications service provider, which receives the client-specific sets of control data (submitted from the client side) for adjusting the data communications services being provided to the submitting client.

By using a common interface protocol (e.g., the programming language, codes or command sets) which is understood by the data communications service provider, authentication and updating for added (telephony) services is readily achieved automatically and remotely without burdening the data communications service provider with cost-intensive set up procedures. Depending on the level of services being added/changed for each client, and/or depending on the client's manual-operator and/or automated technology, the programming instructions can be generated and submitted in various (coded) ways such as described above and also, for example, by dial tone input generated remotely on behalf of each client, by smartphone app specific to the client, by voice recognition, or combinations thereof. The client-specific sets of control data for a particular client entity may be generated based on various data metrics including, for example, data communication events or data received from the data communication server, client-specific directives received in the form of user input (e.g., input via dial-tones and/or GUI), data acquired from a client (e.g., from a client database), and/or data provided by third parties (e.g., third party monitoring services).

To provide a simplified, yet customizable solution that protects the security of the underlying data communication system and client entity data, the set of adjusted virtual office features may be provided to the end-users of the particular client entity in a programming language that includes communication flow commands for communication routing logic (such as an XML language, XML-derivative language, or other language described herein). Moreover, the virtual office features may be dynamically adjusted to account for changing needs of the client entity. As such, the set of adjusted virtual office features may be revised via the data communication server, responsive and according to additional sets of client-specific control data received from the particular client entity. For instance, the set of adjusted virtual office features may be revised via the data communication server responsive and according to instructions configuring customized alerts for the particular client entity. Such customized alerts can define a manner in which notifications, alerts, and/or specified types of messages are provided to end-users of the client entity. As the client entity grows (or constricts, as the case may be), the client entity may adjust policies that govern such notifications, alerts by the data communication server.

Turning now to the figures, FIG. 1 is a diagram for customized monitoring and alerts using a high-level programming interface, consistent with embodiments of the present disclosure. The system includes a computing server 110 configured to provide data communications for a plurality of endpoint devices 152, 154, 156, 162, 164, and 166 connected in one or more data networks 130 and 140. The endpoint devices may include data communication-enabled devices (e.g., IP phones, smart phones, tablets, and/or desktop computers with appropriate data communication software applications) and/or non-data communication endpoint devices (e.g., plain old telephone service (POTS) telephones and cellular-capable devices). Each endpoint device is respectively associated with an account of a respective client. Endpoint devices may be associated with a particular client account by registering the endpoint device with a particular client account serviced by the data communication server. Registered devices for each client account may be listed in a respective account settings file (not shown) stored by the data communication servers 110. In this example, endpoint devices 152, 154, and 156 are associated within an account 150 for a first client A and endpoint devices 162, 164, and 166 are associated within an account 160 for a second client B.

The system includes one or more processing circuits configured to implement client-specific control engines 120, which are configured to adjust the data communications provided for each client account according to a respective set of control directives. For instance, the client-specific control engines 120 may adjust routing of a data communication for a client account by providing programming instructions (from which client-specific sets of control data are derived) to the data communication server 110. For example, the client-specific control engines 120 may generate client-specific sets of control data by processing the respective set of control directives for the account in response to data communication event data or other data prompts received from the data communication server(s) 110. For instance, the control directives for a client account may be configured to adjust routing of a particular data communication in response to communication event data indicating a new incoming communication to an endpoint of the client account.

The control directives for a client account may generate the programming instructions based on various data metrics including, for example, data communication events or data received from the data communication server, user input (e.g., input via dial-tones and/or GUI), data acquired from a client (e.g., from a client database), and/or data provided by third parties (e.g., third party monitoring services). The client-specific control engines 120 communicate the client-specific control data to the data communication server(s) using an interface protocol having an instruction format that is independent of an instruction format used to implement the client-specific control engines 120 and/or client-specific control directives. The independent instruction format of the interface protocol allows clients to write programming instructions including complex logic and various data sources, for example, using various different high-level languages without regard to the particular language used to implement or communicate with the data communication provider server. In some embodiments, the instruction set of the interface protocol may be configured to limit customer control over certain data communication settings—thereby preventing clients from disrupting operations of the computing service with faulty client-specified directive code.

Different embodiments may implement the client-specific control engines 120 in various locations. For example, client-specific control engines 120 for one or more client accounts may be implemented in a central server connected to, or incorporated with, the data communication server(s) 110. Additionally or alternatively, one or more client-specific control engine(s) 120 may be implemented by one or more processing circuits maintained by the client (e.g., server/database 168). Similarly, the control directives may be stored locally within the client-specific control engines, or stored remotely (e.g., in a centralized database, in a database maintained by the client or a combination thereof).

As previously described, client-specific control engines may be used to facilitate adjustment of a variety of virtual office features including, for example, data communication services such as data communications, audio and/or video conferencing, IPBX exchange servers, packet switching, and traffic management as well as non-data communication services including, but not limited to, website hosting, remote data storage, remote computing services, virtual computing environments. One or more of such virtual office features may be provided, for example, by a cloud computing network having one or more servers configurable to provide a data communication system for a plurality of clients.

Figure 2:
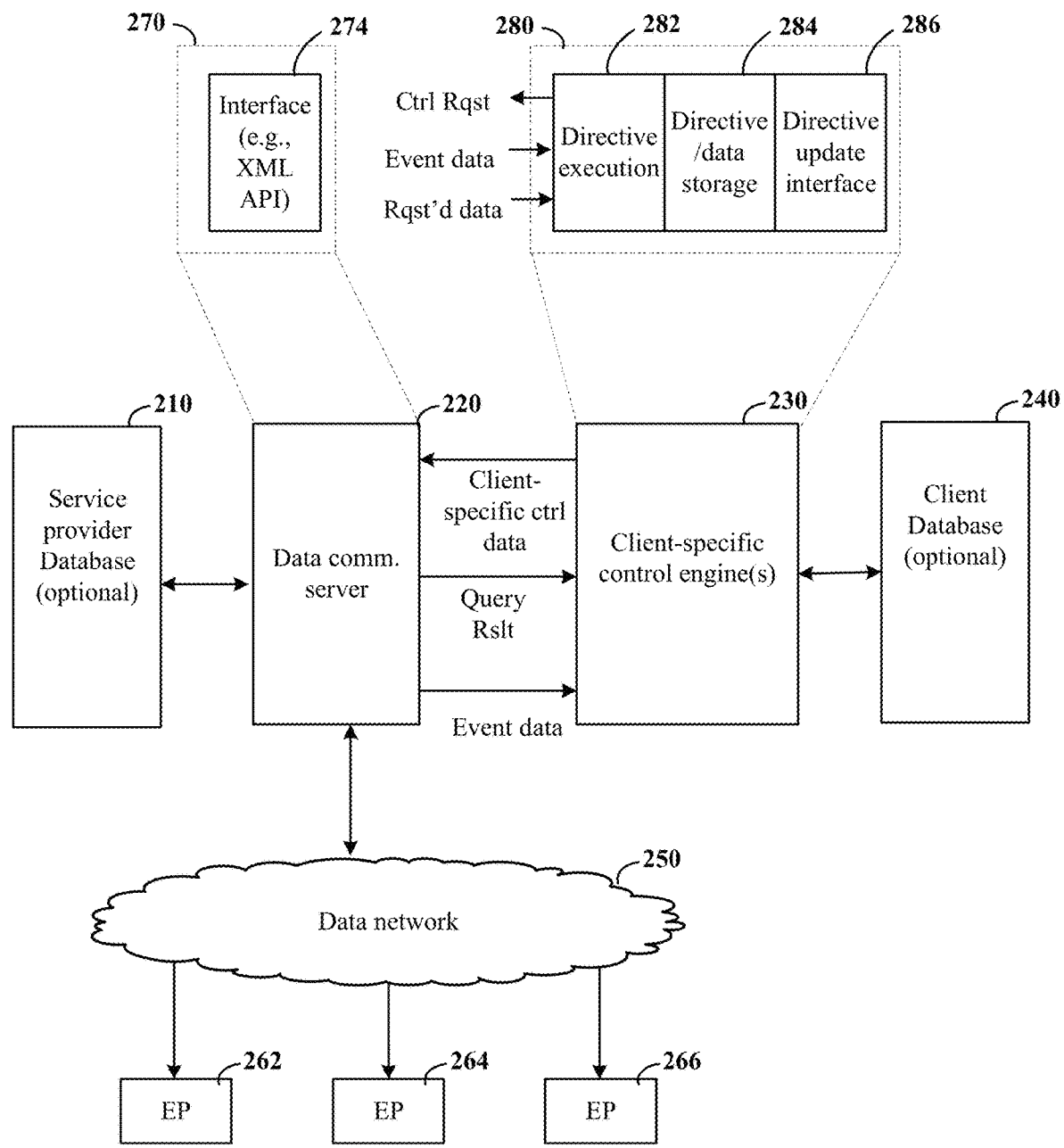
FIG. 2 is a block diagram of a communication control engine with high-level programmable language logic for two different languages, consistent with embodiments of the present disclosure.

FIG. 2 is a block diagram of a communication control engine with high-level programmable language logic for two different languages, consistent with embodiments of the present disclosure. The system includes a data communication provider server 220 configurable to provide one or more virtual office features for a plurality of endpoint devices 262, 264, and 266 connected in a data network 250. The endpoint devices may include data communication-enabled devices (e.g., IP phones, smart phones, tables, and/or desktop computers) and/or non-data communication endpoint devices (e.g., plain old telephone service (POTS) telephones and cellular-capable devices). Each endpoint device is respectively associated with an account of a respective client.

The system includes a processing circuit(s) configured to implement client-specific control engines 230. The client-specific control engines 230 are configured, as described with reference to client-specific control engines 120, to adjust the virtual office features (e.g., data communications) provided for each client account according to a respective set of control directives. For instance, the client-specific control engines 230 may dynamically adjust a manner in which performance of the virtual office features are monitored by the data communication provider server 220, and a manner in which alerts may be provided to a client entity if the performance of the virtual office features satisfies criteria established in defined in the one or more sets of control directives specified for the client entity.

As described with reference to FIG. 1, the control directives for a client account may generate client-specific sets of control data based on various data metrics including for example, data communication events or data received from the data communication server, data acquired from a client (e.g., from a client database), and/or data provided by third parties (e.g., third party monitoring services). In some embodiments, the control directives may cause the client-specific control engine 230 to query data from a client database 240 or from a service provider database 210. In some embodiments, the control directives may cause the client-specific control engine 230 to issue an analytics request specifying a particular evaluation of data in a database (e.g., 210 or 240). For example, client-specific control data communicated to the data communication provider server 220 may prompt the data communication provider server 220 to monitor particular data communication data for a client entity and/or to perform a particular analytical evaluation of data stored in the service provider database 210. After completing the requested monitoring and/or evaluation, the data communication provider server 220 communicates the result back to the requesting client-specific control engine 230. Data retrieved from the databases and/or via analytics evaluation may be used, for example, to dynamically adjust the virtual office features provided during operation. Based on the completed monitoring and/or evaluation, the data communication provider server 220 may provide to the client entity, via the data network 250, an alert corresponding to the monitoring and/or evaluation. For instance, the data communication provider server 220 may provide an alert to the client entity indicating that a server providing particular virtual office features is underperforming, and/or that the virtual office features provided to the client entity are operating in accordance with defined performance parameters.

The client-specific control engines 230 communicate the client-specific control data to the data communication server(s) using an interface protocol having an instruction format that is independent of an instruction format used to implement the client-specific control engines 230 and/or client-specific control directives.

As previously described, the independent instruction format of the interface protocol allows clients to write programming instructions, for example, using their preferred high-level programming and/or may be used to limit customer access and/or control over the data communication provider server. For example, the interface protocol may be configured to allow the client-specific control engines to request analysis of data in the service provider database 210 without allowing direct access to the raw data stored therein. Similarly, the client-specific control engines may be configured to request analysis of data in the client database 240, without allowing direct access to the raw data stored therein.

As described with reference to FIG. 1, client-specific control engines 230 may be implemented in various locations. For example, client-specific control engines 230 for a particular client account may be implemented in the data communication provider server(s) 220, in a separate processing circuit communicatively connected to the data communication provider server(s) 220, using one or more processing circuits of the client, or a combination thereof.

The data communication provider server 220 and client-specific control engines 230 may be implemented using various circuit arrangements. Block 270 shows an example implementation of a data communication provider server configured to provide a data communication IPBX service for a client. The example data communication provider server 270 includes one or more IPBX server(s) configured to establish and direct data communications for a plurality of endpoints of a customer account. Interface circuit 274 is configured to allow different client specific control engines to communicate with the data communication provider server 220 via a common high-level language instruction set (e.g., a set of XML instructions).

Block 280 shows an example implementation of a client-specific control engine 230. In this example, the client-specific control engine includes a storage circuit 284 configured to store control directives and/or data for one or more client accounts. Directive execution circuit 282 is configured to provide client-specific control of the remote services provided for a client via execution of the control directives for the client stored in storage circuit 284. In some implementations, the directive execution circuit 282 is configured to communicate client-specific control data to the data communication provider server 220, for example, via an interface, using a high-level language instruction set (e.g., a set of extensible meta-data language (XML) instructions). Additionally or alternatively, the directive execution circuit 282 may retrieve one or more sets of directives from an external source (e.g., a client database). In this example, the client-specific control engine shown in block 280 includes a directive update interface circuit 286 configured to facilitate upload and/or editing of control directives for a client account.

Figure 3:
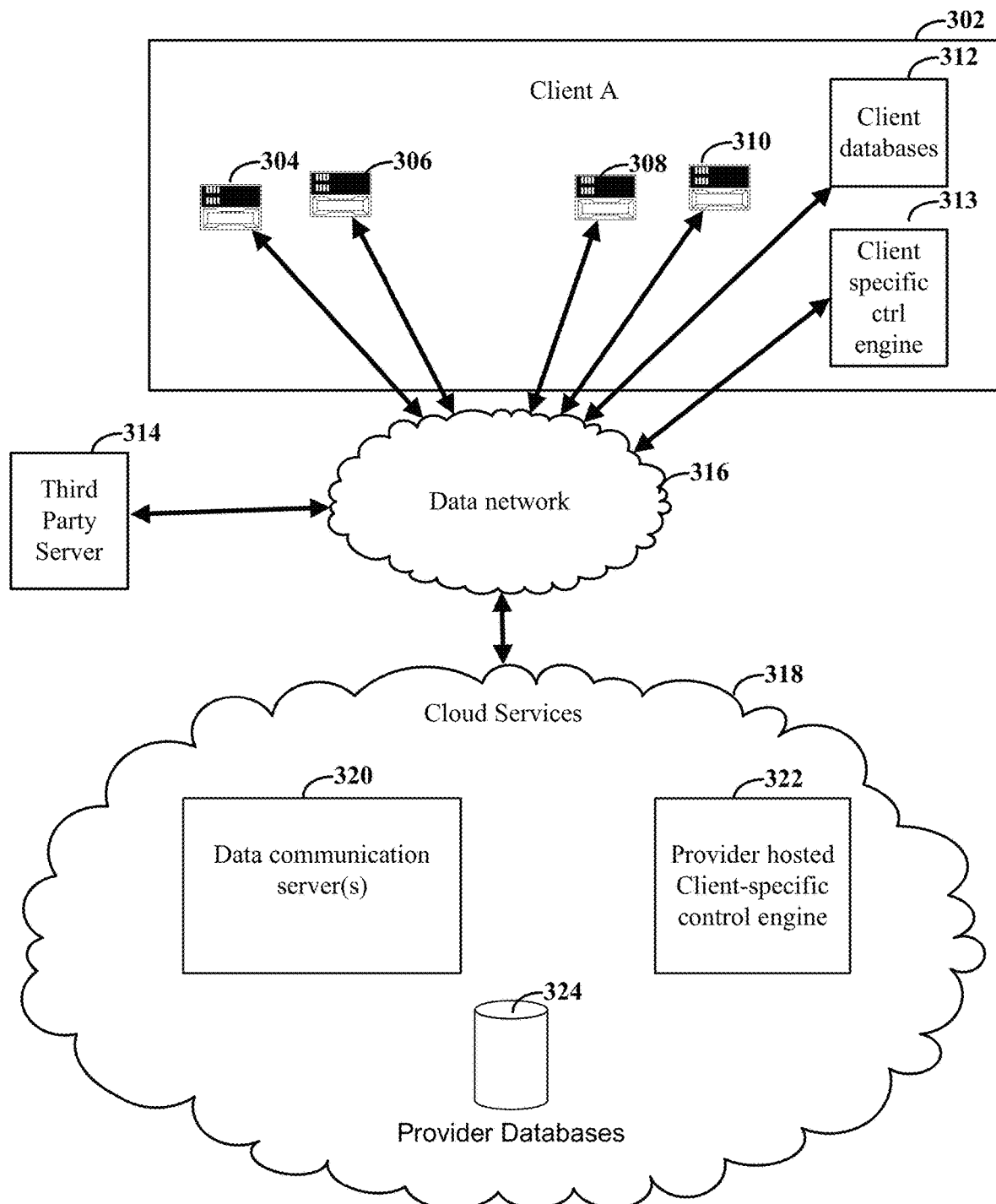
FIG. 3 is a diagram for a system that uses a high-level programming language for customized communication monitoring and alerts, consistent with embodiments of the present disclosure.

FIG. 3 is a diagram for a system that uses a high-level programming language for customized communication monitoring and alerts, consistent with embodiments of the present disclosure. In connection with these specifically-illustrated examples, data communication endpoint devices 304, 306, 308, and 310 connected in a data network 316 are configured to place and receive data communication between other data communication endpoint devices, and/or between non-data communication endpoint devices. Non-data communication endpoint devices may include, for example, plain old telephone service (POTS) telephones and cellular-capable devices, which might also be data communication capable (e.g., smart phones with appropriate data communication software applications). The various endpoint devices include circuitry that is specially configured to provide communications functions that include interfacing with the appropriate circuitry of the communication service provider used by the corresponding endpoint device. In many contexts, a data communication endpoint device is a data communication-capable telephone commonly referred to as IP phones. The data communication endpoint devices can include, but are not limited to, desktop computers, mobile (smart) phones, laptop computers, and tablets. When each of the endpoint devices originates or receives a communication in a telephone network, each can be characterized or referred to as an addressable communication endpoint.

The communication routing and other services for the data communication can be provided by one or more data communication servers 320 within a cloud services system 318 (e.g., configured to provide virtual office features to customers of the data communication provider). In particular example embodiments, the data communication servers 320 can be located within the cloud services system 318. The cloud services system 318 also includes one or more provider hosted client-specific control engines 322, configured as described with reference to 230 in FIGS. 2 and 120 in FIG. 1. A client-specific control engine 313 may also be implemented locally by a client (e.g., 302). In some embodiments, data centers can be part of a cloud services system 318 where the hardware providing the cloud services is located in a number of different data centers with different physical locations. Consistent with embodiments, the cloud services can include SIP servers, media servers, and servers providing other services to both data communication endpoint devices and the users of the data communication endpoint devices. In some instances, the various servers, including both the data communication servers and data analytic servers discussed herein, can have their functions spread across different physical and logical components. For instance, a cloud-based solution can implement virtual servers that can share common hardware and can be migrated between different underlying hardware. Moreover, separate servers or modules can be configured to work together so that they collectively function as a single unified server.

A particular example of a data communication server uses session initiation protocol (SIP) to handle various communication functions (e.g., communication setup and tear down); however, the various embodiments discussed herein are not necessarily limited thereto. Consistent with the above and other embodiments disclosed herein, the data communication servers can be configured to establish a portion of the communication from the data communication endpoint devices to another data communication endpoint device, or to a gateway.

According to various embodiments, one or more data analytics servers can monitor and analyze communication data relating to the data communication servers and data communication endpoint devices. For example, a data analytics server can be designed to track communication statistics about various different communication-related parameters, such as communication duration, communication date, communication time of day, contacted parties, endpoint devices, selected data centers, selected carriers, dropped communications, transferred communications, voicemail access, conferencing features, and others. The high-level programming language(s) and the data communication servers executing the languages can access the communication summary metrics and the data analytics, which can be stored in a provider database 324. For example, a script running the data communication server could parse communication processing XML (CPXML) documents to generate database queries that direct the data communication server to query, or subscribe to, communication length summaries for all communications made to endpoints that are registered to the data communication server. The script could then use the information to provide alerts to the client entity 302 based on the communication summary metrics and/or data analytics. According to various embodiments, the database queries could be sent to a customer database 312.

Consistent with certain embodiments, the data communication server can be configured to interface with customer databases 312, or with third party servers 314. For instance, a CPXML document stored by the cloud services system 318 can identify, based upon a received communication, a Uniform Resource Identifier (URI) that points to customer databases 312, or to a third party server 314. Control directives provided from these servers, for example, in the form of a CPXML document can be used to specify communication routing, or other functions.

Figure 4:
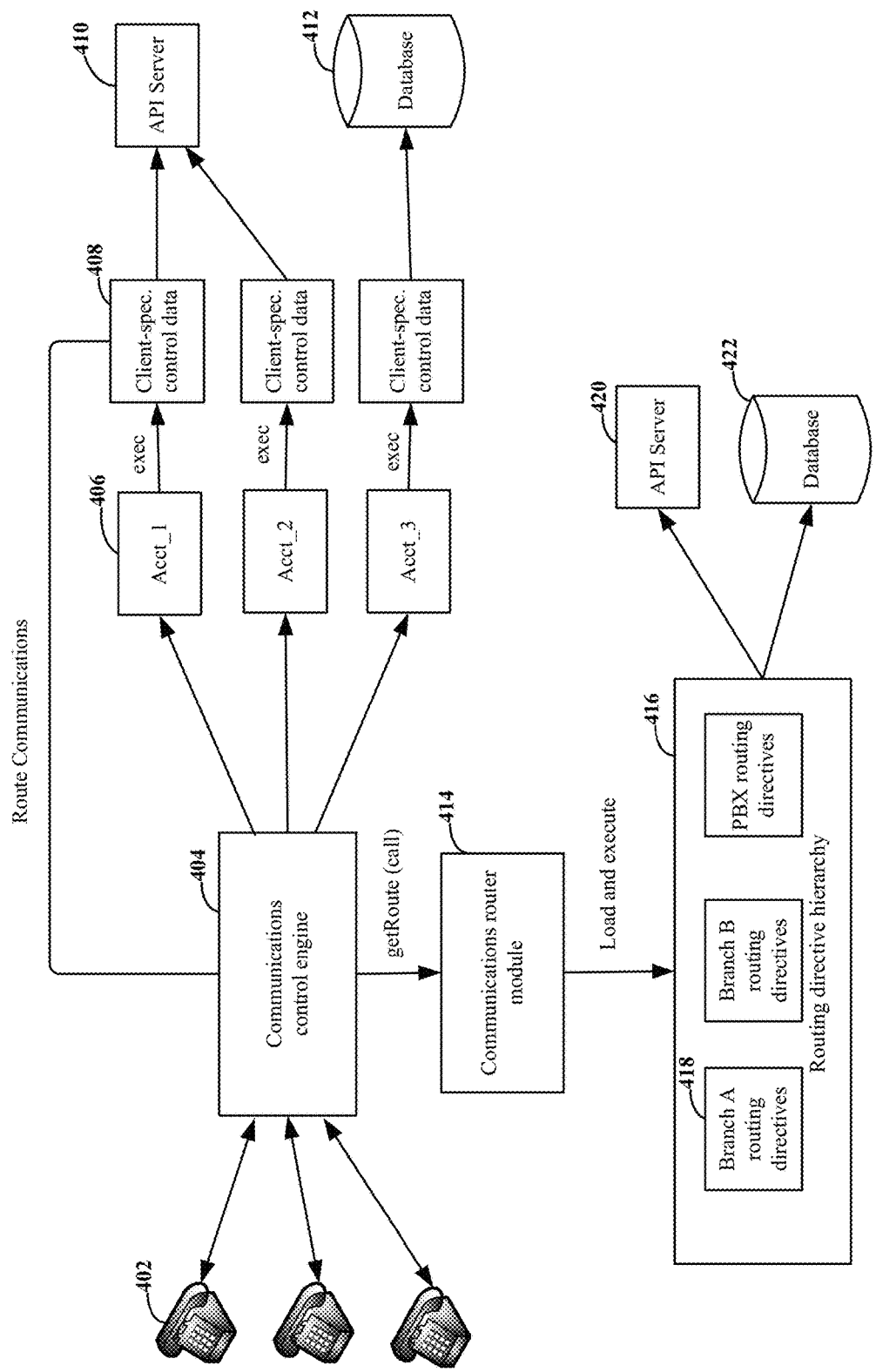
FIG. 4 is a block diagram showing the use of a hierarchy of programmable language documents, consistent with embodiments of the present disclosure.

FIG. 4 is a block diagram showing the use of a hierarchy of programmable language documents, consistent with embodiments of the present disclosure. Communication control engine 404 can provide communication flow control and routing in a manner that can be consistent with discussions found herein and relating to communication control engines, data communication servers, and the other figures. Consistent with various embodiments, the communication control engine 404 is a PBX that is part of a data communication system. For instance, the PBX can be configured using Java-based applications that manage data communication networks. The PBX can be hosted by a data communication service provider and located at one or more data centers. Various PBX features can be provided, such as communication forwarding, remote pickup, communication routing, and voice mail.

Consistent with various embodiments, customers of a data communication provider can use the data communication system by generating documents written in both CRXML and CPXML. Together, the documents specify how the customer would like communication intercept to be handled for both inbound and outbound communications. For instance, a CPXML document 408 can be associated with an extension account 406, or with groups of extension accounts. The extension accounts 406 can represent a specific individual and their associated extension number(s). A CPXML document 408 that is configured in this manner will be invoked by the communication control engine 404 after an incoming communication is routed to an extension that has CPXML capabilities enabled. CPXML documents can also be used for communication flow processing of outbound communications. The CPXML document may provide logic for sophisticated communication control functions for outbound communications. For example, messages (e.g. text messages and email messages) can be automatically generated in response to outgoing communications and restrictions can be placed on outbound communications based upon factors such as time of day or communication history.

The communication control engine 404 may also consult with communication router module 414. The communication routers can be programmed using CRXML documents 418, and with JavaScript for dynamic data access and logic handling. The CRXML documents 418 can be arranged in router XML hierarchy 416, which can specify different CRXML documents 418 depending upon the branch or PBX that is identified as corresponding to the communication. Once the communication router documents are loaded, they can be cached in memory and used by the communication control engine 404 to make a routing decision. When a communication is routed through the communication control engine 404, the communication control engine can consult with high-level CRXML documents. The branch level can be identified, for example, based on the branch ID of caller (for outbound calls) or callee (for inbound calls). Delineations other than the branch are also possible, such as by the called country, the particular store, the state, or other. If a route result is not determined, the communication control engine 404 can also consult with PBX-level CRXML document to obtain routing decisions.

The communication router module 414 can also interact with a CPXML document to handle sophisticated communication flow scenarios where the communication routing is changed after the initial determination. For example, the CPXML can include commands (e.g., "reroute") that the communication control engine 404 uses to provide feedback to the programmable communication router module 414, which use CRXML for initial routing decisions. This might allow, as an example, a CRXML routing decision to be overridden by the CPXML document(s).

According to particular embodiments, the programmable communication router module (using CRXML) 414 can be viewed as plugins to the communication control engine 404. The communication router plugins may have two levels—Branch and PBX levels. The communication router supports CRXML-defined structures that specify how the PaaS can be utilized by a customer. For example, the CRMXL can define sets of conditional statements, data access requests, and communication routing commands: if/else, condition, goto, log, var, script, query, data, accept, reject, route statements, or other similar commands. In particular embodiments, CRMXL can be considered a subset of CPXML by containing a part, but not all, of the CPXML communication flow commands. This distinction can be useful for keeping CRMXL documents light weight so that communication routing decisions are simplified and efficient. More complex tasks, such as the use of media and advanced communication handling, can be handled using CPXML. Using such programmable communication routes, a few example uses include: school district that generates SMS/Email notifications to parents whenever an emergency number is dialed; off hour restriction of outbound communication with CPXML; communication center lockdown to provide outbound dialing restriction for phones; computer initiated dialing with caller identification (ID) override based destination database table, and communication return to target DID/agents; and implementation of a communication black list (denying communications to/from the list) or white list (allowing communications to/from the list) with potentially large lists and dynamic updating capabilities.

Consistent with embodiments of the present disclosure, both CRXML and CPXML provide the capability of handling dynamic data from multiple sources. Examples of these sources are depicted as application program interface servers 410, 420 and databases 412, 422. The dynamic data can therefore be provided from a variety of sources including, but not necessarily limited to, communication route session data (caller id, callee id, or route from/to), query custom object (to a database) in the data communication provider system/cloud, and access data through HTTP RESTful API. For instance, the XML documents can include a web resource that is identified by Uniform Resource Identifiers. The web resource might be a customer HTTP server that responds to a conditional query (e.g., whether a communication queue is above a threshold) with CPXML code that instructs the communication control engine on how to route, or otherwise handle, the communication. In such a manner, client-specific sets of control data provided by the communication control engine may allow for adjusted (e.g., customized) virtual office features for end users (such as 402) of the data communication system.

Figure 5:
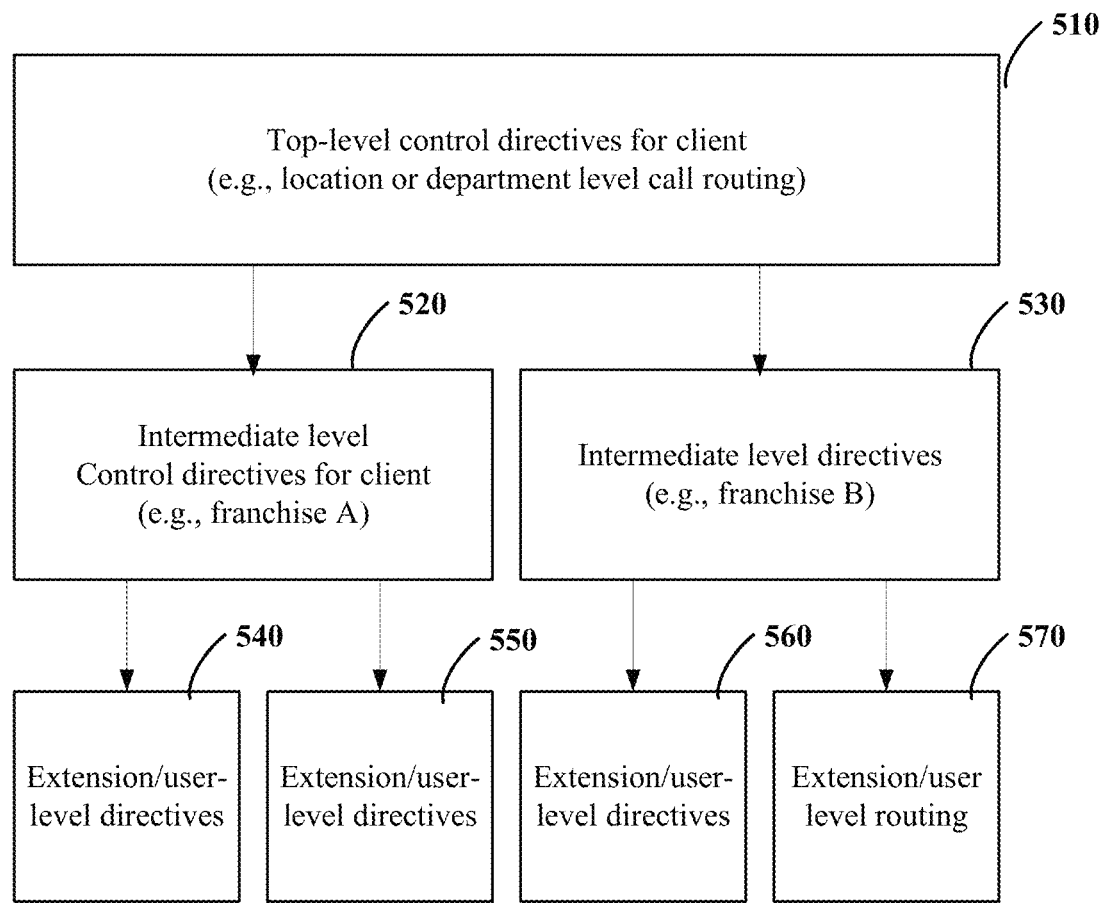
FIG. 5 is a block diagram showing an example set of control directives configured for multiple levels of control, consistent with embodiments of the present disclosure.

FIG. 5 is a block diagram showing an example set of control directives configured for multiple levels of control, consistent with embodiments of the present disclosure. The control directives described herein can be used to form programming instructions which can be transmitted to the data communication provider for adjusting the virtual office features provided to the client entity. In this example, block 510 provides a set of top-level control directives that are applicable to all data communications for a client. Blocks 520 and 530 show a set of intermediate-level control directives that are applicable only to a subset of endpoints included in the client account (e.g., for respective IPBXs, branches, department, and/or franchisees). Blocks 540, 550, 560, 570 are shown as lower-level control directives that are applicable to particular extensions and/or end-users of the client account. The lower-level control directives may be useful, for example, for an end-user to customize and/or dynamically adjust direction of communications to an extension throughout the day.

Figure 6:
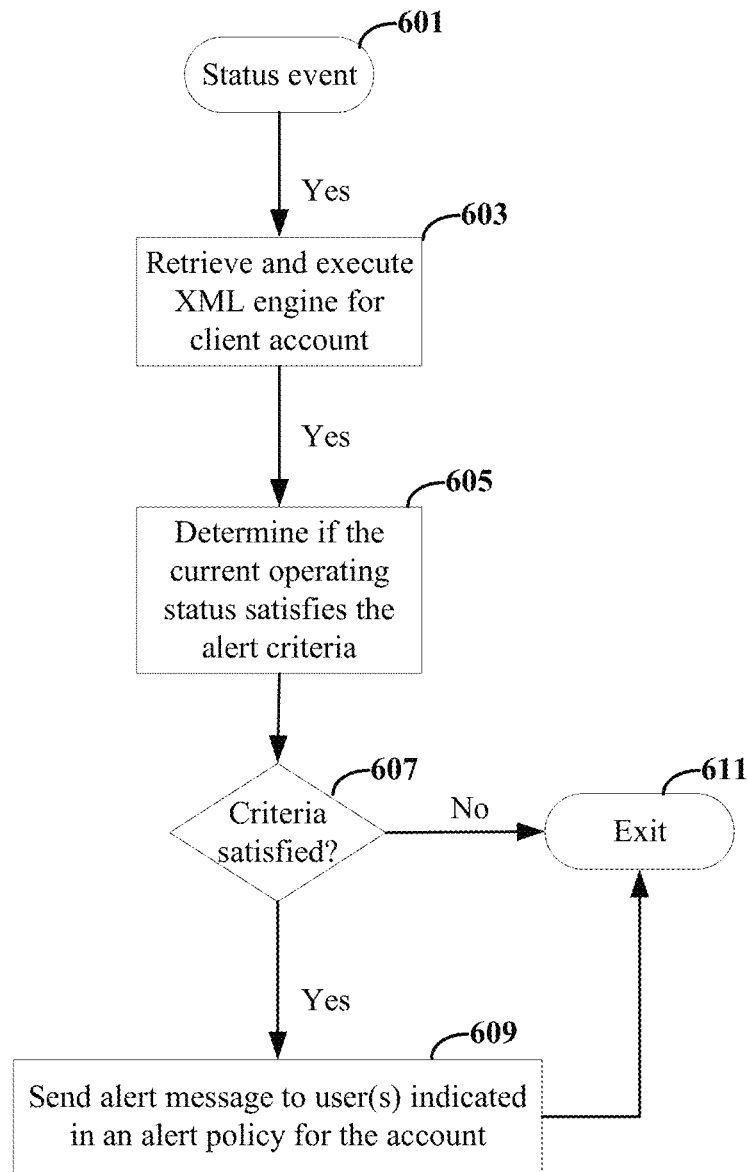
FIG. 6 is a flow diagram showing illustrating a method of customized communication monitoring and alerts using a high-level programming interface, consistent with embodiments of the present disclosure.

FIG. 6 a flow diagram illustrating a method of customized communication monitoring and alerts using a high-level programming interface, consistent with embodiments of the present disclosure. As discussed herein, each client entity may be configured to interface with a data communication provider server providing a database of virtual office features available based on a subscription, via a data communication client server. Each of a plurality of client entities may be associated with one or more different end-users. The data communication provider server may provide a database of virtual office features that are available to the client entities based on a subscription. Each client entity may specify a manner in which the virtual office features provided to the end-users are monitored by the data communication provider. Similarly, each client entity may specify performance parameters for each of the virtual office features, and criteria under which an alert or alerts may be provided to the client entity (and/or the end-users, as the case may be).

To provide customized communication monitoring and alerts using a high-level programming interface, a method may begin at 601 with receiving event data corresponding to virtual office features provided to end-users of a remotely-situated client entity based on a subscription. As discussed further herein, each of a plurality of client entities may specify various virtual office features to be provided to end-users of the client entity. Moreover, each client entity may specify a manner in which the virtual office features are provided to the end-users, as well as a manner in which the performance of those virtual office features are monitored. At 603, the method includes monitoring an operating state of each of the virtual office features provided to the end-users based on the event data. For instance, the method may include monitoring a communication duration, an average transmission time for a mixed-media message over the data communication system, among other examples.

At 605, the method includes determining if the operating state of each of the virtual office features satisfies alert criteria. The alert criteria may be specified in client-specific sets of control data derived from programming instructions received over a message exchange protocol between the data communication server and data sources (as described herein). For instance, as discussed and illustrated with regard to FIG. 1, the programming instructions defining monitoring and alert criteria for a particular client entity may be transmitted between the data communication provider server and the data communication client server via the interface protocol and in particular programming languages.

At 607, the method includes determining if the alert criteria (specified in the client-specific sets of control data) are satisfied. If it is determined that the alert criteria are not satisfied, the method includes exiting the alert process at block 611. Similarly, if it is determined that the alert criteria are satisfied, the method includes sending an alert message to user(s) indicated in an alert policy for the account at block 609. Accordingly, the method includes generating an alert to an end-user associated with the client entity, responsive to event data satisfying the defined alert criteria. As described herein, the alert criteria may specify performance metrics of a particular server, and/or performance metrics of particular virtual office features, among others.

More Detailed and/or Experimental Embodiments

Consistent with the above-characterized embodiments, various other embodiments are based on implementations which involve alternative features and/or involving a type of programming language which is different than disclosed above for use as part of the above embodiments. Accordingly, the present disclosure is not necessarily limited to specific methods, systems, applications and devices in and stemming from the specific embodiments disclosed herein. Other related embodiments and aspects can be fully incorporated in each such disclosed (contemplated/suggested) embodiment. Some of these aspects and embodiments would be recognized from the following discussion.

In certain embodiments, the client-specific control engines provide client-specific control data to the data communication server(s) via an interface protocol platform that characterizes the format in which the client-specific sets of data are communicated to the data communication server. According to various embodiments, data is communicated via the interface protocol platform using high-level programming language instruction set. The high-level programming language instruction set allows a programmer access to the data communications server(s) (or PaaS computing server(s) providing remote services) by way a controlled and limited set of communication control operations and functions. The limitations on the operations can be particularly useful for allowing programming control to be placed into the hands of different customers of the provider of the data communication servers. For example, the provider can update or make other changes to how the data communication servers are configured without requiring modification to documents written to use the high-level language, which might otherwise be required to account for the changes. Moreover, the data communication servers and their data can be protected from poor programming decisions (intentional or otherwise) by tightly controlling the extent that the documents provide control or access the inner workings of the data communication servers.

Consistent with the above discussion, at the client side of the data communications services, the client's computer-based processing (e.g., by the client-specific control engine) generates and submits control (routing/data-communication) directives for assessment and use by the data communications service provider. In a typical implementation, these directives can be realized using codes or one or more commands (or a script of program-created commands). As examples, such codes or command sets can be implemented using a variety of programming control approaches. These approaches include, for example, a programming language (such as C++, XML, JAVA, HTLM, SQL, etc.) common to both the client-specific control engine and to the data communications service provider, which receives the directives (submitted from the client side) for adjusting the data communications services being provided to the submitting client. In some implementations, look-up tables with codes/commands as entries can be used by the client engines each time a service change is needed. The entries can be pre-generated by the service provider for use by the client, manually entered by either the client or an installer, and/or generated by logic circuitry (such as implemented in hosted FPGA fabric). For instance, entries may be generated by logic circuitry based on a set of limited assumptions and conditions applicable to that specific type of client and its service expectations/subscription (e.g., no more than 10 extension phone lines in any designated geographic region, only 2 designated extension lines permitted to videoconference, etc.).

By using a common interface protocol (e.g., the programming language, codes or command sets) which is understood by the data communications service provider, authentication and updating for added (telephony) services is readily achieved automatically and remotely without burdening the data communications service provider with cost-intensive set up procedures. Depending on the level of services being added/changed for each client, and/or depending on the client's manual-operator and/or automated technology, the control directives can be generated and submitted in various (coded) ways such as described above and also, for example, by dial tone input generated remotely on behalf of each client, by smartphone app specific to the client, by voice recognition, or combinations thereof. The client engine can also prompt the user to effect and select decisions upon certain client-generated or provider-prompted events. Consistent with the instant disclosure, control directives can be generated by the client (and/or client engines) based on various criteria/parameters According to embodiments of the present disclosure, the data communication servers can be configured to use different high-level programming languages for different functions, where each programming language has a different set of commands. For example, a first high-level programming language can be used to create documents that control communication routing decisions for high volumes of communication traffic, as might occur at the edge of a data communication provider's system. These communication routing decisions can, for example, identify a particular branch office or an IPBX of a particular customer. The identified IPBX might then have additional documents written to communicate using a second high-level programming language that is tailored toward more specific communication processing capabilities that might be associated with a particular account or another identifiable grouping. The distinction between the two programming languages can be particularly useful in terms of improving the scalability of the system. For instance, the language used for communication routing decisions can be relatively light weight, with fewer commands and capabilities. In particular implementations, the first (communication routing) language can contain a subset of the commands available in the second (communication processing) language.

According to various embodiments, the high-level, domain-specific programming language(s) are defined using a markup language as the basis for the language structure. More particular embodiments use extensible markup language (XML). An XML model defines the constraints on the high-level language, including defining the set of valid commands that can be carried out by the data communication servers. Within these constraints, a customer can write XML code that self-describes the building blocks used in the customer's particular application. Another aspect of the communication processing XML is that it allows for various different data structures to be embedded into the XML document or file. For example, a script written in JavaScript can be embedded as character data that the data communication servers are configured to identify and execute. Unless otherwise stated, the use of XML in connection with various embodiments does not necessarily limit the corresponding embodiments, such as limiting the embodiments to the use of only an XML-based language(s).

Particular implementations relate to the use of two separate languages, one that can be used for initial communication routing and the other for providing more complex and specific communication processing functions. In various portions of the present disclosure, the two languages are referred to as either communication processing XML (CPXML) or communication routing XML (CRXML).

The data communication servers providing the underlying function for the PaaS can be configured to utilize a high-level, domain-specific programming language. A particular example language is referred to as Communication Processing eXtensible Markup Language (CPXML). CPXML refers to a communication processing language which defines the message exchange protocol between a communication control server (e.g., an IntraSwitch with a CPXML Engine) and other sources of information, such as databases, web applications, authentication servers, and servers providing various communication-related services. CPXML can allow developers to program communication processing logic or service execution logic with both XML building blocks and JavaScript/TCL, or other scripting languages. In certain implementations, CPXML allows PaaS customer developers to program and integrate data communication flow (e.g., as provided by a cloud-based data communication service) with customer or third party application servers and databases.

A CPXML engine can send requests to a web server and get XML (CPXML) responses for processing, thereby operating in a stateless manner that is similar to HTML/Internet browser. The CPXML engine can interpret a received CPXML response, and render (execute) CPXML building blocks. Each building block can define functions relating to voice, communication control, and flow control logic. The CPXML engine may also execute other types of code, such as JavaScript, to create dynamic content (e.g., dynamically generated CPXML) for client-side flow control. Each CPXML document may have URL links to a web server for iterative processing, or it may include query requests for retrieving data from various sources. A query could be formatted for consistency with the source of the data (e.g., by using JavaScript Object Notation (JSON) to retrieve data from third party application servers or from the data communication server provider's cloud database). This information can then be used to drive communication flow or communication control decisions.

CRXML defines a limited set of commands to the communication routing logic that allows a customer to define how a communication is initially routed. Maintaining the CRXML as a limited set of simple building block commands can help with the efficiency of the communication control switch. For example, the communication control switch can be located at the perimeter of the data communication provider's routing network, which implies that it may be required to handle a large volume of data communication. The efficiency in processing the large volume of communications can have a significant impact on the performance of the system.

Consistent with various embodiments, the CRXML documents specify a first level of communication routing and simple communication processing that are carried out by the communication control switch. For example, a communication control switch may provide communication routing options for multiple branch offices or locations and for multiple PBXs that support the branch locations. Each branch and PBX may have multiple customer (user) accounts associated therewith. CRXML documents can be used to determine the routing for a communication by identifying a particular branch location, a particular PBX and particular data communication customer account to use in subsequent communication processing and routing. The initial routing decision is indicated by the arrow labelled as "account selection," which shows the passage of control to a communication processing engine.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a communication control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, a (data communication) endpoint device (or endpoint) includes a communication circuit and (computer) processing circuits which are configured to establish (data communication) communication sessions with other endpoint devices (e.g., personal computers, IP-enabled mobile phones, and tablet computers). In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. An apparatus for communications over one or more wide-band networks, the apparatus comprising:
   one or more computer processor circuits, including an IPBX, configured and arranged to:
      interface with remotely-situated client entities using a first programming language associated with a message exchange protocol between data sources and a data communication server, including the IPBX, that is to use the Internet to facilitate IP communications between endpoints on behalf of client entities that subscribe to virtual office features provided via the data communication server that includes the IPBX;
      provide a database of virtual office features to the client entities based on a subscription; and
      generate event data corresponding to the virtual office features provided to the client entities; and
   a communication control device including at least part of the data communication server, the communication control device configured and arranged to, for each respective client entity:
      adjust the virtual office features provided to end-users of the client entity based on client-specific sets of control data derived from programming instructions received over the message exchange protocol, wherein the programming instructions correspond to a second programming language that is compatible with the first programming language;
      monitor an operating state of each of the virtual office features provided to the end-users based on the event data; and
      generate an alert to an end-user associated with the client entity, according to the event data satisfying a set of criteria specified in the client-specific sets of control data for the client entity, wherein the communication control device is to monitor an operating state of a client-specific IPBX server that is associated with the client entity and is coupled to the data communication server via the Internet, and wherein the alert criteria for the associated client entity is specified as a function of a processing load or memory usage of the associated server.

2. The apparatus of claim 1, wherein the communication control device is configured and arranged to monitor an operating state of the client-specific IPBX server, and the alert criteria for the client entity is specified as a function of a processing load of the server.

3. The apparatus of claim 1, wherein the communication control device is configured and arranged to monitor an operating state of the client-specific IPBX server, and the alert criteria for the client entity is specified as a function of memory usage of the server.

4. The apparatus of claim 1, wherein
the alert criteria for a first virtual office feature is specified as a function of a response time or latency of the virtual office feature; and
the alert criteria for a second virtual office feature is specified as a function of a current number of users of the second virtual office feature.

5. The apparatus of claim 1, wherein the communication control device is further configured and arranged to:
provide the alert message to a first one of the end-users by sending an SMS text message notification to one or more telephone numbers indicated in the client-specific sets of control data;
provide the alert message to a second one of the end-users by initiating an automated voice communication to one or more telephone numbers indicated in the client-specific sets of control data; and
provide the alert message to a third one of the end-users by sending an email notification to one or more email addresses indicated in the client-specific sets of control data.

6. The apparatus of claim 1, wherein the communication control device is further configured and arranged, in response to the set of alert criteria being satisfied, to perform a set of actions listed in an alert policy indicated in the client-specific sets of control data.

7. An apparatus, comprising:
a computing server, configured as an IPBX server, configured and arranged to:
provide data communications for a plurality of extensions, each respectively associated with an account of a respective client entity, and
interface with a data communication server, also configured as a part of the IPBX server, configured and arranged to provide virtual office features to the extensions based on a subscription; and
a processing circuit operated on behalf of the client entity, communicatively coupled to the computing server and configured and arranged to:
receive from the data communication server, a set of instructions written in a first programming language that relates to a message exchange protocol between the data communication server and data sources;
generate a set of instructions written in a second programming language based on directives received as input on behalf of a respective client entity, wherein the second programming language is associated with virtual office features available to the client entity and includes alert criteria for the client entity; and
facilitate comparison of operating state information associated with the virtual office features to the alert criteria by communicating the operating state information to the data communication server in real-time, wherein the computing server is to monitor an operating state of the processing circuit and is coupled to the computing server via the Internet, and wherein the alert criteria for the client entity is specified as a function of a processing load or memory usage of the processing circuit.

8. The apparatus of claim 7, wherein the processing circuit is configured and arranged to determine the operating state information as a function of response time or latency of the virtual office features provided to the end-users.

9. A method for use in a data communication system, comprising:
at a computing server configured as an IPBX server, receiving event data corresponding to virtual office features provided to end-users of a remotely-situated client entity based on a subscription, the event data being received from a processing circuit on behalf of the remotely-situated client entity, wherein the processing circuit is also configured as a part of the IPBX server;
monitoring an operating state of each of the virtual office features provided to the end-users based on the event data;
determining if the operating state of each of the virtual office features satisfies alert criteria specified in client-specific sets of control data derived from programming instructions received over a message exchange protocol between a data communication server and data sources, wherein the programming instructions correspond to a second programming language that is compatible with a first programming language utilized by the data communication server; and
generating an alert to an end-user associated with the client entity, responsive to the event data satisfying the alert criteria, wherein the computing server is to monitor an operating state of the processing circuit and is coupled to the computing server via the Internet, and wherein the alert criteria for the client entity is specified as a function of a processing load or memory usage of the processing circuit.

10. The method of claim 9, including generating the alert responsive to the processing load of the server satisfying alert criteria relating to the processing load of the processing circuit.

11. The method of claim 9, including generating the alert responsive to the memory usage of the processing circuit satisfying alert criteria relating to the memory usage of the processing circuit.

12. The method of claim 9, wherein each of the virtual office features is associated with a different respective alert criteria, the method including generating an alert responsive to satisfaction of at least one of the respective alert criteria.

13. The method of claim 12, wherein the alert criteria for one of the virtual office features is specified as a function of a response time or latency of the virtual office feature.

14. The method of claim 12, wherein the alert criteria for one of the virtual office features is specified as a function of a current number of users of the virtual office feature.

15. The method of claim 9, including:
providing the alert message to a first one of the end-users by sending a text message notification to one or more telephone numbers indicated in the client-specific sets of control data; and
providing the alert message to a second one of the end-users by initiating an automated voice communication to one or more telephone numbers indicated in the client-specific sets of control data.

16. The method of claim 9, including providing the alert message to different respective end-users in a manner indicated in the client-specific sets of control data, the method including providing the alert message to an end-user by sending an email notification to one or more email addresses indicated in the client-specific sets of control data.

17. The method of claim 9, including, in response to the set of alert criteria being satisfied, performing a set of actions listed in an alert policy indicated in the client-specific sets of control data.

18. The method of claim 9, including determining the operating state of each of the virtual office features as a function of response time or latency of the virtual office features provided to the end-users.

* * * * *